Aug. 24, 1965   A. KONOPA   3,201,824
HOLDER FOR BIRDS
Filed Dec. 13, 1963

INVENTOR.
ANNA KONOPA
BY
Charles L. Lovercheck
atty

3,201,824
HOLDER FOR BIRDS
Anna Konopa, Rte. 1, West Springfield, Pa.
Filed Dec. 13, 1963, Ser. No. 330,292
5 Claims. (Cl. 17—11)

This invention relates to devices and apparatus for supporting birds for processing, cooking, and preparation.

Birds that are processed and cooked usually have had their insides removed and may be filled with dressing or other food or condiments. It is desirable to hold the wings and drumsticks of the bird in a particular position during processing or cooking. This has been done by various methods, none of which are entirely satisfactory.

It is an object of the present invention to provide a device for holding a bird in position with its drumsticks and wings urged toward the center of the bird.

Another object of the invention is to provide a device for holding a bird in position during processing which is simple in construction, economical to manufacture, and simple and efficient to use.

A further object of the invention is to provide a generally U-shaped wire member for holding the drumsticks and tail of a bird together and a chain adapted to extend under the breast bone of the bird through the ends of the U-shaped member and having its ends attached to the wings of the bird whereby the drumsticks, wings, and tail are all urged together.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 3:
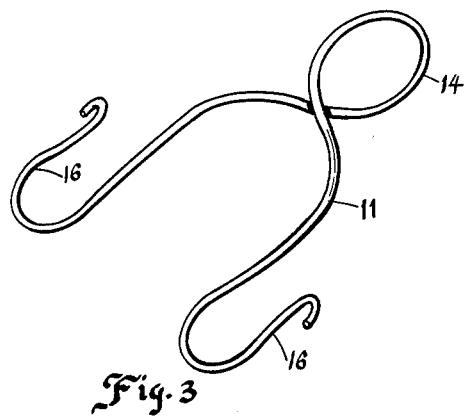
FIG. 3 is a view of the wire U-shaped member having an overhand loop formed in the intermediate part thereof.
Figure 2:
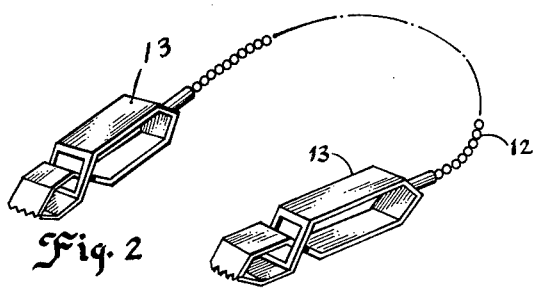
FIG. 2 is a view of the chain.

Now with more particular reference to the drawing, the device shown comprises the U-shaped member shown in FIG. 3 and the chain shown in FIG. 2. A chain 12 may be made of any suitable link material, but it is preferred to use a ball like series of links having clips 13 on the ends thereof. The clips shown are of the type frequently used in electrical work, however, the clips and the chain could be of any other suitable style or type. The chain 12 has sufficient length so that it will extend through hooks 16 on a U-shaped member 11, back under the breast bone at 17, and rest in taut position whereby it will urge the legs of the U-shaped member 11 together. Since the U-shaped member legs will ordinarily be clamped to the bird's drumsticks, they will be urged together also.

The U-shaped member 11 has an overhand loop 14 formed in the intermediate part thereof and the hooks 16 formed on the ends of the legs of the U-shaped member by bending the ends of the legs back on themselves. The ends of the U-shaped member may have their ends turned downward so that they do not catch on clothing of the cook or on the oven or furniture.

Figure 1:
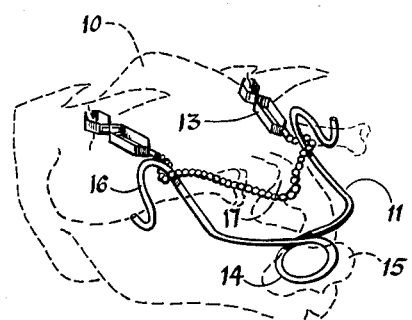
FIG. 1 is a view of a device according to the invention supported on a bird or fowl.

When the device is to be put into operation as shown in FIG. 1, a bird 10 is prepared by stuffing or otherwise, having had its feathers plucked off. The bird is laid on its back and the overhand loop 14 is supported around the tail 15 of the bird. The hooks 16 are hooked over the ends of the drumsticks as shown. The hooks may be so formed that they exert a clamping force on the drumsticks. The clips 13 will then be snapped onto the ends of the wings of the bird with the intermediate part extending through the hooks and over the ends of the legs of the U-shaped member 11. The rear end of the chain will extend under the back end of the breastbone 17 of the bird. Thus, when the clips 13 are attached, they will cause the legs of the U-shaped member to be sprung inward, thereby holding the drumsticks together and holding the wings rearward. This will exert a pressure on the sides of the fowl and tend to hold it together so it will not need to be sewed together as securely. Also, the drumsticks, wings, and entire bird will be cooked more evenly.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a device for holding the wings and drumstick of a bird in position comprising
   a relatively flexible elongated member having means at the ends thereof adapted to be attached to the wings of a bird,
   a U-shaped relatively rigid resilient member,
   said U-shaped member having legs and an intermediate part and having means at the intermediate part thereof for attaching it to the rear end of said bird,
   and means on the ends of said legs of said U-shaped members to receive an intermediate part of said flexible member and to receive the ends of the drumsticks of said bird whereby said wings and drumsticks are held in position.

2. The combination recited in claim 1 wherein
   said U-shaped member comprises a wire having a portion bent back on itself defining an overhand loop,
   said overhand loop comprising said means for attaching said relatively rigid member to the rear end of said bird.

3. The combination recited in claim 2 wherein
   said overhand loop is adapted to receive the tail of said bird.

4. The combination recited in claim 1 wherein
   said means on the ends of said flexible member comprises clips adapted to be attached to the ends of said wings of said bird.

5. In combination, a device for holding the wings and drumsticks of a bird in position comprising
   a relatively rigid resilient wire,
   a relatively flexible chain,
   said wire being generally U-shaped with an intermediate portion and leg portions,
   said intermediate portion being bent back on itself defining a means to receive the tail of said bird,
   hooks formed on the ends of the legs of said wire by bending said legs and back on themselves,
   said hooks being adapted to receive the ends of the drumsticks of said bird,
   and an intermediate portion of said chain being adapted to extend through said hooks,
   the part of said chain intermediate said chain being adapted to extend under the rear end of the breastbone of said bird,
said chain having clips on the end thereof for attaching said chain to the wings of said bird whereby said chain is held taut and said wings and drumsticks are urged together.

No references cited.

SAMUEL KOREN, *Primary Examiner.*
LUCIE H. LAUDENSLAGER, *Examiner.*